United States Patent
Benedict et al.

(10) Patent No.: US 6,842,438 B1
(45) Date of Patent: *Jan. 11, 2005

(54) METHOD TO DYNAMICALLY DETERMINE INTERFERENCE AND CARRIER-TO-INTERFERENCE RATION DURING TDMA CALLS

(75) Inventors: Russell Bernard Benedict, Scotch Plains, NJ (US); Alex Matusevich, Morris Plains, NJ (US); Winston Edward Pekrul, Piscataway, NJ (US); Jonathan Michael Tobias, Florham Park, NJ (US); Chris Constantine Tsamutalis, Long Valley, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 685 days.

(21) Appl. No.: 09/604,764

(22) Filed: Jun. 26, 2000

(51) Int. Cl.[7] .............................................. H04B 7/212
(52) U.S. Cl. ...................... 370/328; 370/336; 370/337; 455/67.13; 455/226.3
(58) Field of Search ................................ 370/252, 328, 370/331, 332, 333, 336, 337, 345; 455/452.2, 63.1, 67.13, 501, 114.2, 226.3

(56) References Cited

U.S. PATENT DOCUMENTS

| | | | | |
|---|---|---|---|---|
| 6,002,673 A | * | 12/1999 | Kahn et al. | 370/252 |
| 6,112,066 A | * | 8/2000 | Hofmann et al. | 455/226.2 |
| 6,131,033 A | * | 10/2000 | Shi | 455/446 |
| 6,163,678 A | * | 12/2000 | Murata | 455/12.1 |
| 6,201,795 B1 | * | 3/2001 | Baum et al. | 370/252 |
| 6,295,279 B1 | * | 9/2001 | Lin | 370/252 |
| 6,650,872 B1 | * | 11/2003 | Karlsson | 370/329 |

FOREIGN PATENT DOCUMENTS

| | | |
|---|---|---|
| WO | 99 49587 A | 9/1999 |
| WO | 99 49689 A | 9/1999 |

* cited by examiner

*Primary Examiner*—John Pezzlo
*Assistant Examiner*—Saba Tsegaye

(57) ABSTRACT

In the method for dynamically determining interference and carrier-to-interference ratio, interference is measured during an active TDMA time slot. In one embodiment, a base station determines the interference level in an active time slot using power level measurement taken during a DTX OFF period, when a mobile station is transmitting in discontinuous transmission mode. In another embodiment, a base station orders a mobile station to cease transmission during a SACCH portion of the time slot, and determines an interference level I measurement using power level measurements taken during the inactive SACCH field. Another embodiment provides for the determination of an interference level I using power level measurements taken during the guard and ramp fields.

14 Claims, 6 Drawing Sheets

PRIOR ART

METHOD TO DYNAMICALLY DETERMINE INTERFERENCE AND CARRIER-TO-INTERFERENCE RATION DURING TDMA CALLS

FIELD OF INVENTION

This invention relates to a method to dynamically determine interference and carrier-to-interference ratio in a time-division multiple access wireless system.

BACKGROUND

Wireless systems divide a large service area into a number of smaller discrete geographic coverage areas called "cells." Each cell is contiguous with adjacent cells to provide continuous coverage throughout a service area. A base station having a plurality of transceivers is provided for each of the cells within the service area. FIG. 1 illustrates elements residing in a typical cell, including a base station 10 and mobile stations 12.

In a time division multiple access (TDMA) system, a mobile station 12 transmits a burst of an information-bearing signal, such as a coded speech signal, at a carrier frequency within a designated time slot, the time slot occurring within a defined frame of fixed duration. A single time slot reoccurs at specified time intervals in subsequent frames. A communication channel is defined in terms of a particular time slot and a carrier frequency. While one mobile station 12 in a system is transmitting in one time slot, other mobile stations 12 may operate at the same frequency using the other time slots within the frame.

Radio frequency (RF) interference in a wireless system degrades the quality of the communications between the base station 10 and the mobile stations 12 within the cell. In order to compensate for higher interference levels within a cell, the base station 10 and the mobile stations 12 may transmit at a higher power level, so that interference does not overwhelm the signals transmitted by the base station 10 and the mobile stations 12. However, while a higher transmit power level may compensate for high interference levels, the use of higher transmit power levels adds further RF interference to the environment, and places increased power demands on the base station 10 and the mobile stations 12. Cell site engineers must therefore balance the need for a minimum voice quality with the adverse effects associated with increased transmit power levels.

A measure of quality for voice communications may be expressed as the ratio of signal carrier power level (or, carrier level C) to the interference level I in the cell, known as the carrier-to-interference (C/I) ratio. As cell capacities increase, and voice communication quality decreases, cell site engineers can compensate for interference by adjusting cell coverage based upon C/I ratios. A C/I ratio can be used as a handoff trigger, or as a flag to cell site operators that the RF coverage plan may require reengineering.

In order to properly adjust cell coverage, cell site engineers must have access to accurate values for both the carrier power level and the interference level I. Carrier power levels are relatively easy to obtain because the base station 10 continuously measures the carrier power level of signals received from the mobile stations 12. It is more difficult, however, to obtain accurate interference level I values.

A conventional method of measuring interference includes taking static interference measurements at certain times of the day during an inactive TDMA time slot. A channel, and its reoccurring time slot, are "active" when a mobile station 12 assigned to the channel is in communication with a base station 10 during the channel's time slot, the continued communication over successive frames being known as a "call." The conventional interference measurements on inactive time slots are "static" measurements because they are made at predetermined times of the day. Because data is not transmitted in the inactive time slot, a measure of received power during the time slot reflects the level of interference during the time slot. A problem with static interference measurements is that interference dynamically changes during a call, and static interference measurements do not reflect these dynamic changes.

FIG. 2 illustrates another conventional technique for measuring interference in a TDMA system. In FIG. 2, time slots 1 and 3 are transmitting an active call (carrier ON), while time slot 2 is inactive (carrier OFF). An interference measurement may therefore be taken during the inactive time slot 2. While this technique provides an accurate measure of the interference level I during the inactive time slot 2, and may be used at any time of the day, it may only be used when a time slot is inactive. This is a serious shortcoming because interference levels are most likely to vary during the busiest periods of the day, when the fewest number of times slots are available for interference measurement.

SUMMARY OF THE INVENTION

The present invention overcomes the disadvantages of conventional measurement techniques by determining an interference level I and a C/I ratio during an active TDMA time slot.

In a first embodiment of the invention, a measurement station (e.g., a base station) determines an interference level I and a C/I ratio during an active time slot while a mobile station transmits in the time slot in discontinuous transmission (DTX) mode. During discontinuous transmission, only a portion of a channel's time slot is used to convey voice and control data. In this embodiment, the mobile station transmits a signal to a base station to alert the base station that it will begin transmitting in DTX mode. The base station then determines an interference level I from power level measurements taken during the unused portion of the active DTX time slot. Carrier strength C is determined by measuring the carrier power level of active fields in the active time slot, and a C/I ratio is calculated from the determined C and I values.

In a second embodiment of the invention, an interference level I is determined from power level measurements taken during an inactive slow associated control channel (SACCH) field of an active time slot. The SACCH field is a signaling field for transmission of control and supervisory messages, and often transmits repetitive or unnecessary data. The base station anticipates these unnecessary transmissions and orders the mobile station to cease SACCH transmissions for a specified number of frames. The base station then measures the power level during the inactive SACCH field of the uplink transmission in order to determine the interference level I during the active time slot. A carrier strength C is determined by measuring the carrier power level of active fields in the time slot, and a C/I ratio is calculated from the determined C and I values. In a third embodiment of the invention, an interference level I is determined using the guard and/or ramp fields of an active time slot. Current mobile stations utilize transistors that do not require the full time allotted to standard guard and ramp fields for powering down and powering up. The base station therefore determines the interference level I during an active time slot by measuring the power level during the guard and/or ramp fields of the active time slot, and utilizing selected measured power level values to obtain a measure of the interference level I during the active time slot. A carrier strength C is determined by measuring the carrier power level of active fields in the time slot, and a C/I ratio is calculated from the determined C and I values.

In the above embodiments, the base station may sample multiple active time slots during a call to obtain updated values for the interference level I and the C/I ratio.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
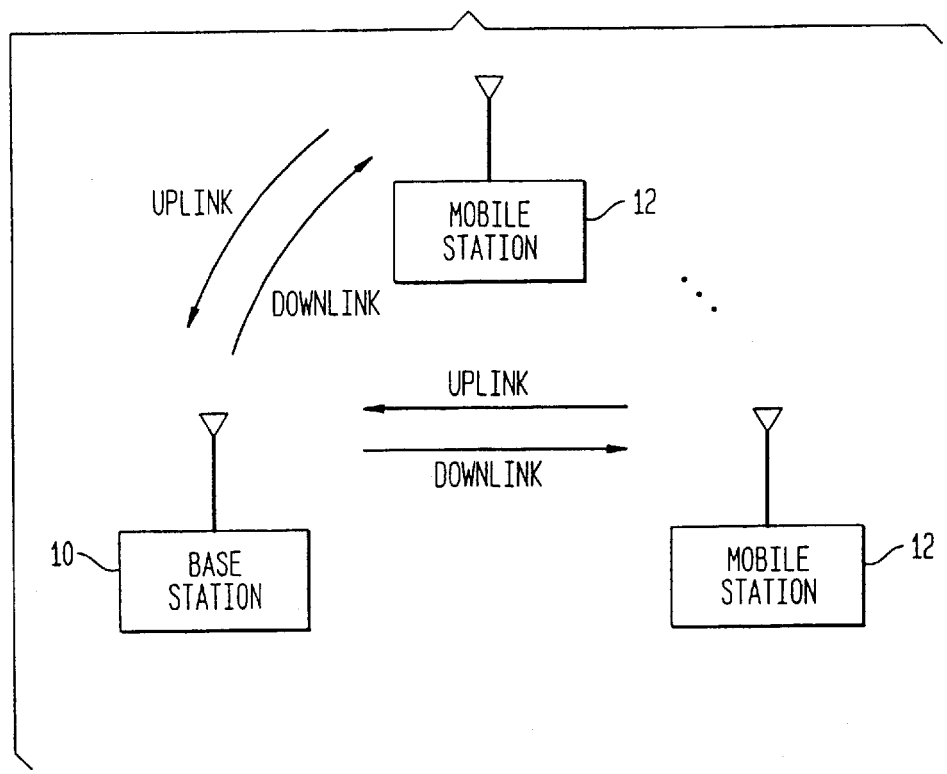
FIG. 1 is a diagram of a conventional wireless communication system.
Figure 2:
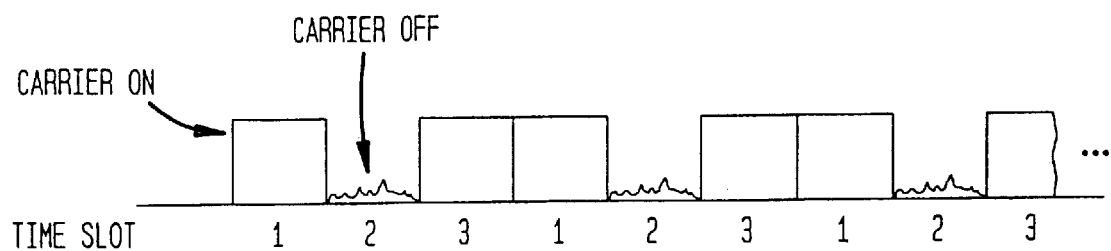
FIG. 2 illustrates measurement of interference during an inactive time slot.
Figure 3:
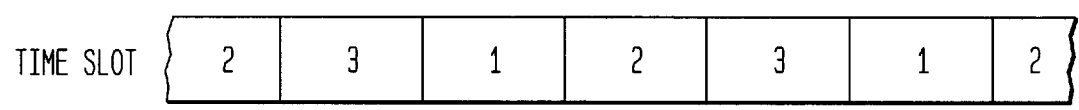
FIG. 3 illustrates a series of TDMA time slots.
Figure 4:
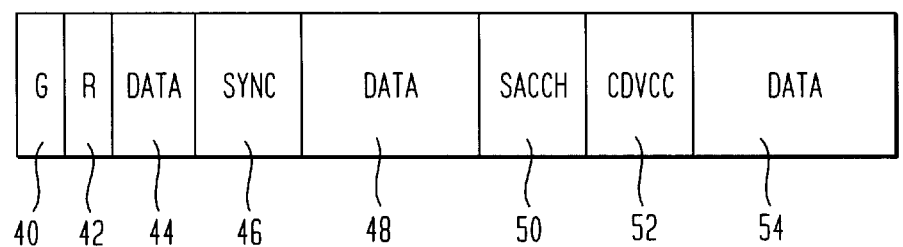
FIG. 4 illustrates a conventional TDMA time slot format.

The preferred embodiments of the present invention will be discussed with reference to FIGS. 3 and 4, which show exemplary arrangements of TDMA time slots and data fields within a TDMA time slot, respectively. These figures are provided for the purpose of illustration, and are not limitative of the present invention. FIGS. 3 and 4 will be briefly discussed below, followed by a description of three preferred embodiments of the invention.

FIG. 3 illustrates an exemplary arrangement of time slots in a TDMA transmission. In a typical TDMA transmission, a sequence of frames is transmitted, with the frames being subdivided into time slots. In the example of FIG. 3, 6 time slots comprise a frame, with 3 time slots comprising a half-frame. It will be understood that the present invention is not limited to TDMA systems having 6 time slots per frame.

FIG. 4 illustrates an exemplary arrangement of data fields associated with one time slot in FIG. 3. It will be understood that the format of the time slot illustrated in FIG. 4 is merely an example, and the present invention is not limited to a particular format. For, example, the present invention is at least applicable to TDMA standards IS-54 and IS-136.

In FIG. 4, the time slot includes a guard (G) field 40; a ramp (R) field 42, used to provide time for a mobile transmitter to reach full operating power after being off for the previous slots; a first DATA field 44, used to transmit data; a SYNC field 46, used to transmit a synchronization pattern; a second DATA field 48, used to transmit data; a SACCH (slow associated control channel) field 50, used to exchange signaling messages regarding the quality of the channel between the base station 10 and the mobile station 12; a CDVCC (coded digital verification color code) field 52, used to indicate that the base station 10 and a mobile station 12 are exchanging accurate data; and a third DATA field 54, used to transmit data. The first through third DATA fields 44, 48 and 54 can be used to carry information such as voice data.

Measuring Interference During DTX Transmission

According to the first embodiment, interference levels are determined on an active channel while a mobile station assigned to the channel transmits in discontinuous transmission (DTX) mode. Discontinuous transmission is used in order to save battery life in mobile stations, and to reduce interference levels in the wireless environment. In many conversations, it is typical for moments of silence to occur. Accordingly, many voice messages transmitted during a TDMA call carry data representative of silence. These transmissions waste battery power, increase interference in the wireless environment, and convey no useful information. The discontinuous transmission technique reduces these disadvantages by shutting off transmission during a specified period of an active time slot associated with silence.

Figure 5:
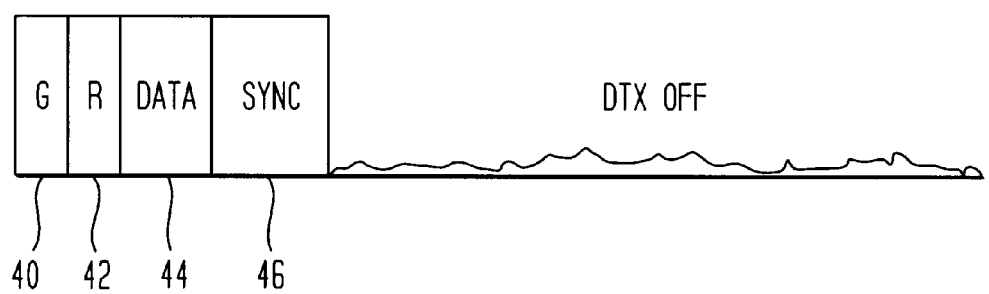
FIG. 5 illustrates a DTX time slot.

FIG. 5 illustrates a format of a time slot in DTX mode. It will be understood that the format of the time slot illustrated in FIG. 5 is merely an example of a DTX time slot, and the present invention is not limited to a particular format. As shown in FIG. 5, the DTX time slot includes the guard, ramp, first DATA, and SYNC fields 40, 42, 44 and 46, and nothing is transmitted during the remainder (the DTX OFF portion) of the time slot. In the first embodiment of the present invention, a base station determines an interference level I using power level measurements taken during the DTX OFF portion of an active time slot.

Figure 6:
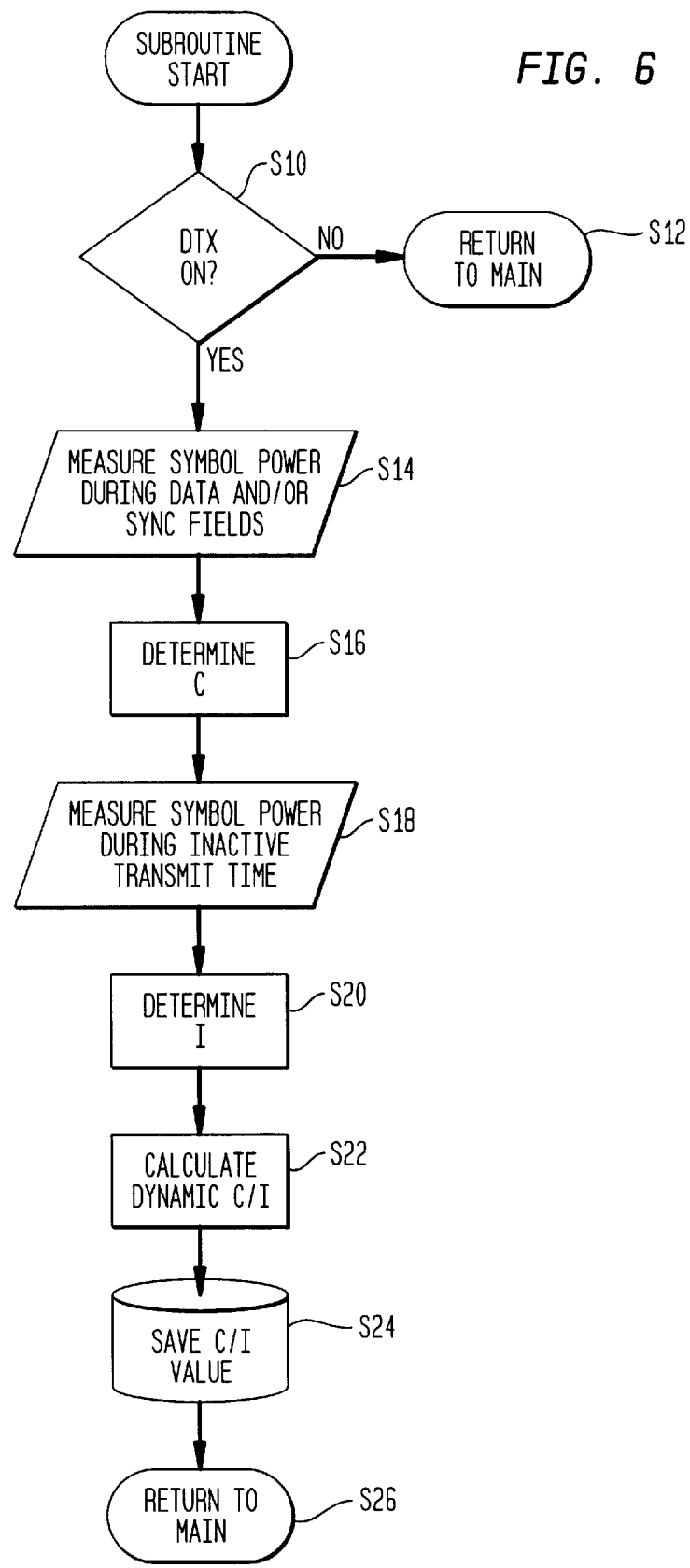
FIG. 6 is a flow chart illustrating a method of interference measurement according to a first embodiment of the present invention.

FIG. 6 is a flow chart of an interference and a C/I ratio determination method according to the first embodiment. In step S10, the base station 10 determines whether the mobile station 12 is transmitting in DTX mode. Prior to transmitting in DTX mode, the mobile station 12 transmits according to a time slot format as shown in FIG. 4. The mobile station 12 assigned to an active time slot initiates DTX transmission by sending a short message in the uplink SACCH field 50 indicating that voice data will not be transmitted for a number of frames. The base station 10 then sends a confirm message to the mobile station 12 verifying that the mobile station will begin transmitting in DTX mode.

The mobile station 12 now transmits data according the to the time slot format in FIG. 5. The base station 10 continues to receive the SYNC field 46 so that it can remain synchronized with the mobile station 12. This prevents the base station 10 from determining that the mobile station 12 has ended the call. If the mobile station 12 does not communicate to the base station 10 that it will operate in DTX mode, the subroutine returns to the main base station control program in step S12.

In step S14, the base station 10 makes one or more measurements of carrier power level during the DATA field 44 and/or the SYNC field 46 during the active portion of the DTX time slot. Discrete measurements of carrier power level in an active field can be obtained over a span of one symbol period. A symbol period lasts for a period of time to transmit one symbol, which represents one or more bits, depending upon the TDMA standard. For the purpose of explanation in this specification, a symbol period will be hereinafter referred to as a "symbol power value," or, a "symbol power."

A symbol power value may be obtained during each of the symbol periods in the first DATA field 44 and the symbol periods in the SYNC field 46. In step S16, the symbol powers are averaged (if multiple values are used) to produce an average carrier level C. Measuring symbol power during all available symbol periods increases the accuracy of the carrier level C calculation, but fewer than all of the available symbol periods can be used to obtain a satisfactory value of average carrier level C. Alternatively, the mobile station 12 can communicate its transmission power level to the base station 10 so that the base station 10 can utilize this value as carrier level C.

In step S18, the base station 10 makes one or more symbol power measurements during the symbol periods in the DTX OFF portion of the DTX time slot. Because the mobile station 12 is not transmitting in the DTX OFF portion, the symbol power values obtained during the DTX OFF portion are a measure of the interference level I in the DTX time slot. All or a portion of the available symbol periods may be used to determine the interference level I during the DTX OFF portion. In step S20, the symbol power values (if multiple values are used) are averaged to determine an average value of interference I in the active DTX time slot.

In step S22, the carrier level C determined in step S16 is divided by the interference level I determined in step S20 in order to generate a carrier-to-interference ratio value C/I. The C/I ratio is saved in a storage device in step S24. The subroutine then returns to the main base station 10 control program in step S26.

The foregoing description describes the determination of an interference level I and a C/I ratio for a single active time slot of a single active channel, but the methods of the present invention are not limited to calculations from a single time slot. A TDMA call consists of a series of successive time slots associated with an active channel, and the present invention allows for the determination of an updated dynamic C/I ratio during each successive time slot of an active channel, or, the selective sampling of time slots of an active channel for updating the C/I ratio. The number of samples depends upon the processing power that the cell site operators wish to devote to the C/I calculations, and the degree of accuracy desired. The base station 10 may also determine interference levels and C/I ratios for multiple channels in a carrier frequency, and across multiple carrier frequencies.

Measuring Interference During the SACCH

As previously described with reference to FIGS. 3 and 4, the SACCH field 50 is a signaling field for transmission of control and supervisory messages between a mobile station 12 and a base station 10. The SACCH field 50 allows for the transmission of control information without interruption of voice data. At certain times, particularly during a call, the SACCH field 50 may carry repetitive data that serves only as a place holder for the SACCH field 50, and the bits or symbols assigned to the SACCH field 50 are essentially unused.

Figure 7:
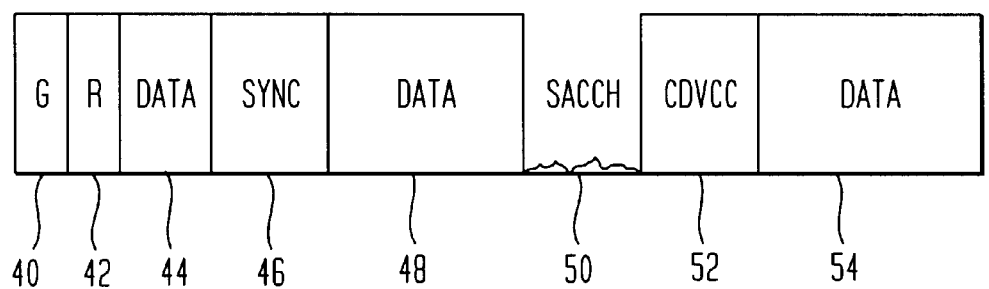
FIG. 7 illustrates a TDMA time slot with an inactive SACCH field.

According to a second embodiment of the invention, the base station 10 takes advantage of the availability of the SACCH field 50 by determining an interference level I and a C/I ratio using power level measurements taken during an inactive SACCH field 50 within an active time slot. In the second embodiment, the base station 10 selectively notifies the mobile station 12 assigned to a channel to cease transmitting during the SACCH field 50 for a number of frames, rendering the SACCH field 50 "inactive" during those frames. FIG. 7 illustrates an exemplary TDMA time slot in which the SACCH field 50 has been rendered inactive. The base station 10 then takes symbol power measurements during the inactive SACCH field 50 in order to determine the interference level I in the active time slot.

Figure 8:
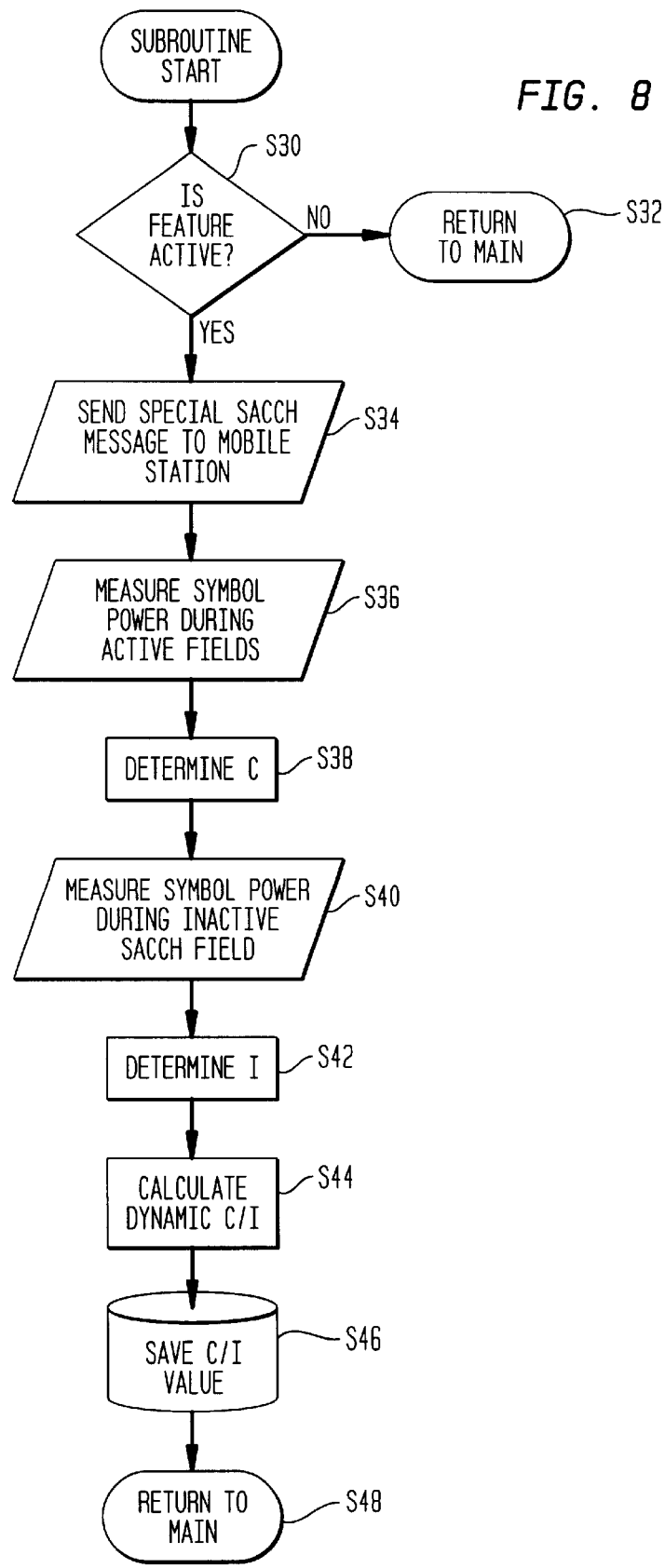
FIG. 8 is a flow chart illustrating a method of interference measurement according to a second embodiment of the present invention.

FIG. 8 is a flow chart of an interference and a C/I ratio determination method according to the second embodiment. In step S30, the base station 10 determines whether the SACCH interference measurement feature is active in the base station 10 controller. A cell site operator can initiate the SACCH measurement subroutine manually, or the subroutine can be initiated in response to a trigger within the system, such as in response to periods of repeated data in a channel's SACCH field, after a predetermined measurement period, etc. If the SACCH interference measurement feature is inactive, processing returns to the main base station 10 control program in step S32.

If the SACCH feature is active, the base station 10 transmits a special SACCH message to the mobile station 12 in step S34. The special SACCH message is a message in the downlink SACCH transmission field ordering the mobile station 12 to cease transmission during a subsequent SACCH field or fields 50 for a specified number of frames. The SACCH field 50 is thus rendered inactive as shown in FIG. 7.

In step S36, one or more symbol power values are obtained during one or more of the first through third DATA fields 44, 48, 54 and the SYNC field 46 in order to determine the carrier level C of the mobile station 12. All or a portion of the symbol periods in the first through third DATA fields 44, 48 and 54 and the SYNC field 46 may be used to determine carrier level C, or, additional active fields may be sampled for symbol power values. In step S38, the symbol power values (if more than one value is used) from the active fields are averaged to determine an average value of the carrier level C.

In step S40, the base station 10 makes symbol power measurements during one or more of the symbol periods in the inactive (as ordered by the base station 10) SACCH field 50. The inactive SACCH field 50 symbol power values provide a measure of the interference level I in the wireless environment during the active time slot. If multiple symbol power values are obtained from the inactive SACCH field 50, these values are averaged to obtain an average value of interference In step S42.

In step S44, the C and I values are used to calculate a dynamic C/I ratio, which is saved in step S46. Processing then returns to the main base station 10 control program in step S48.

The base station 10 may determine an updated dynamic C/I ratio for each successive time slot of an active channel, or it may selectively sample time slots of an active channel for updating the C/I ratio. The base station 10 may also determine interference levels and C/I ratios for multiple channels across multiple carrier frequencies.

Measuring Interference Utilizing the Guard and Ramp Fields

In a third embodiment of the present invention, the base station 10 determines an interference level I and a C/I ratio by determining an interference level I using symbol power measurements taken during the guard and/or ramp fields of an active time slot.

The ramp field 42 provides time for the transistors of a mobile station 12 to reach full operating power after being off during the previous time slots. The ramp field 42 prevents a mobile station 12 from presenting a large power spike to the wireless environment, which would occur if the mobile station 12 were to instantly begin transmission. The guard (G) field 40 provides time in the current active time slot for the transistors in the mobile station 12 assigned to the previous time slot to power down. In practice, current transistors operate such that the full time provided by the ramp and guard fields 42 and 40 in most TDMA standards is not required for powering up or for powering down, and a considerably shorter amount of time is sufficient for both powering up and powering down. This leaves a portion of the guard field 40 and the ramp field 42 unused.

Figure 9:
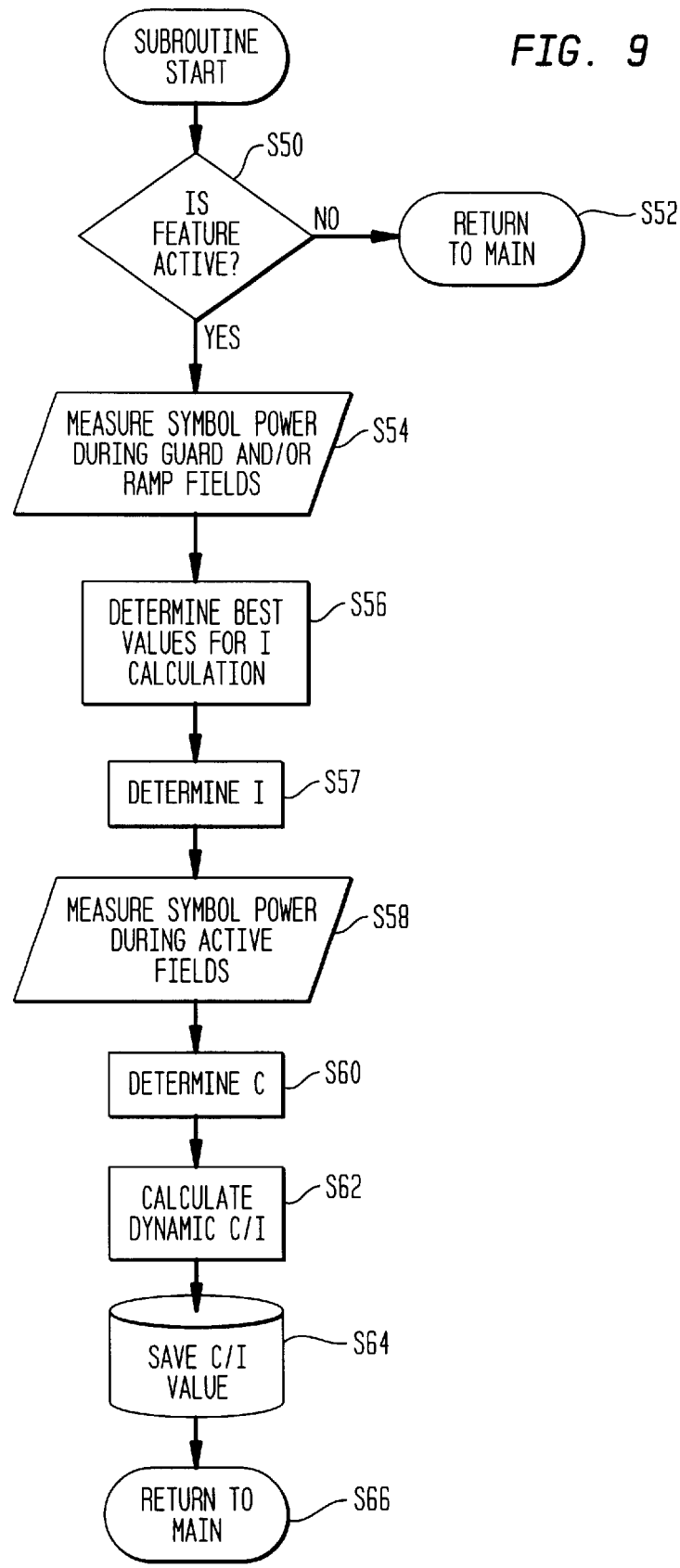
FIG. 9 is a flow chart illustrating a method of interference measurement according to a third embodiment of the present invention.

FIG. 9 is a flow chart illustrating the operation of the third embodiment of the invention. In step S50, the base station 10 determines whether or not interference measurements will be taken during the guard field 40 and the ramp field 42 of the active channel. If the measurement feature is not active, processing returns to the main base station 10 control program in step S52.

If interference measurements and C/I values are to be determined, step S54 is performed. In step S54, the base station 10 takes symbol power measurements during the unused symbol periods (i.e., when a mobile station is neither powering up or powering down) of the guard field 40 and the ramp field 42. In step S56, the base station 10 determines which of the measured guard and/or ramp symbol power values are most suitable for the determination of the interference level I during the active time slot. The base station 10 determines which symbol power values from the guard field 40 and/or the ramp field 42 may be used for interference determination based on its knowledge of the type of transmitter used by the mobile station 12 assigned to the active channel.

The type of mobile station 12 assigned to a particular channel is conveyed in the uplink control channel data to the base station 10. The base station 10 therefore knows how quickly a mobile station 12 can power up and power down, and can select the appropriate symbol periods from the guard field 40 (i.e., those symbol periods when no power down signal will be present) and the ramp field 42 (those symbol periods when no power up signal will be present) to utilize for interference determination. One or more symbol power values are selected for interference measurement in this manner. If multiple values are used, they are averaged to determine an average I value in step S57.

In step S58, one or more symbol power values are obtained during the DATA fields 44, 48, 54 and the SYNC field 46 in order to determine the carrier level C. All or a portion of the symbol power values in the first through third DATA fields 44, 48, 54 and the SYNC field 46 may be used to measure carrier level C, or, additional active fields in the time slot may be sampled for symbol power values. In step S58, the symbol power values (if more than one value is used) from the active fields are averaged to determine an average value of C.

A C/I value is then calculated in step S44 and stored in step S64. The subroutine then returns to the main base station 10 control program in step S66.

The base station 10 may determine an updated dynamic C/I ratio for each successive time slot of an active channel, or, it may selectively sample time slots of an active channel for updating the C/I ratio. The base station 10 may also determine interference levels and C/I ratios for multiple channels across multiple carrier frequencies.

The embodiments of the present invention provide advantages over conventional methods for interference and C/I ratio determination in that interference levels and C/I ratios can be dynamically determined over an active TDMA channel. The dynamically determined C/I ratios provide cell site operators better data with which to adjust cell coverage.

The three embodiments for interference and C/I ratio determination may be used separately or in combination by a base station 10. For example, the DTX measurement method can act as a first option for interference measurement on an active channel. If the base station determines that the mobile station 12 cannot operate in DTX mode, or that DTX transmission is unavailable, it may then attempt to measure interference on the active channel using either the SACCH field measurement method or the guard/ramp field measurement method.

Depending upon the amount of processing power devoted to determining interference and C/I ratios, an interference value I and a C/I ratio may be determined in each successive frame, or sampled from selected frames during a call.

TDMA transmission techniques are used in various systems such as the Global Systems for Mobile Communication (GSM), IS-54 of the Telecommunications Industry Association (TIA), IS-136 of the TIA, Cellular Digital Packet Data (CDPD) System, Enhanced Data Rates Through Global Evolution (EDGE), GPRS—136HS, and Japanese Digital Cordless (JDC). Other similar types of time division techniques are time division duplexing (TDD) (used, for example, in CT-2), and hybrid TDMA/TDD systems such as the personal handy phone (PHP) and digital European cordless telephone (DECT). For the purposes of this invention, TDMA, TDD and TDMA/TDD systems may all be considered as applicable "TDMA systems."

The specification describes various illustrative embodiments of the method of the invention. The scope of the claims is intended to cover various modifications and equivalent arrangements of the illustrative embodiments disclosed is the specification. Therefore, the following claims should be accorded the reasonably broadest interpretation to cover modifications, equivalent structures and features which are consistent with the spirit and scope of the invention disclosed herein.

What is claimed is:

1. A method for detecting interference in a time-division multiple access wireless system, the system including a base station capable of communicating with a plurality of mobile stations, the method comprising:

receiving signals from a mobile station over a frequency having at least one active time slot including a control channel field and at least one non-active time slot, said active time slot being a time slot in which data is transmitted;

detecting interference based on a power level measurement of at least one of the received signals taken in the control channel field of said active time slot; and transmitting a signal to the mobile station instructing the mobile station to cease transmitting during the control channel field.

2. The method of claim 1, wherein said frequency has a plurality of time slots.

3. The method of claim 1, wherein interference is detected during multiple active time slots of a call.

4. The method of claim 1, wherein said active time slot further includes at least one portion containing no data, said detecting step further including detecting interference during said portion containing no data.

5. The method of claim 4, wherein the active time slot is a discontinuous transmission time slot.

6. The method of claim 1, wherein said active time slot further includes a guard field, said detecting step further including detecting interference during the guard field.

7. The method of claim 1, wherein said active time slot further includes a ramp field, during which field the mobile station powers up, said detecting step further including detecting interference during the ramp field.

8. A method for determining a carrier-to-interference ratio in a time-division multiple access wireless system, the system including a base station capable of communicating with a plurality of mobile stations, the method comprising:

receiving signals from a mobile station over a frequency having at least one active time slot including a control channel field and at least one non-active time slot, said at least one active time slot being a time slot in which data is transmitted;

detecting interference based on a power level measurement of at least one of the received signals taken in the control channel field of said active time slot;

detecting a carrier signal strength of said active time slot;

determining a carrier to interference ratio of said active time slot based on the detected interference and the detected carrier signal strength; and transmitting a signal to the mobile station instructing the mobile station to cease transmitting during said control channel field.

9. The method of claim 8, wherein said frequency has a plurality of time slots.

10. The method of claim 8, wherein interference is detected during multiple active time slots of a call.

11. The method of claim 8, wherein said active time slot includes at least one portion containing no data, said detecting step detecting interference during said portion containing no data.

12. The method of claim 11, wherein the active time slot is a discontinuous transmission time slot.

13. The method of claim 8, wherein said active time slot further includes a guard field, said detecting step further including detecting interference during the guard field.

14. The method of claim 8, wherein said active time slot further includes a ramp field, during which field the mobile station powers up, said detecting step further including detecting interference during the ramp field.

* * * * *